(12) United States Patent
Bulusu et al.

(10) Patent No.: US 11,494,552 B2
(45) Date of Patent: Nov. 8, 2022

(54) SYSTEM AND METHOD FOR IMPLEMENTING SMART BUSINESS INTELLIGENCE TESTING TOOLS

(71) Applicant: JPMorgan Chase Bank, N.A., New York, NY (US)

(72) Inventors: Phanikumar Bulusu, Secunderabad (IN); Kishore Kumar Kotha, Hyderabad (IN); Ajeethpal Singh Sardar, Hyderabad (IN); Venkata Naga Pavan Kancharala, Andhra Pradesh (IN); Aditya Reddy Gangu, Hyderabad (IN); Ranjith Kumar Paruchuri, Hyderabad (IN); Sita Aparna Mudunuri, Hyderabad (IN); Yogitha Sumana Ramajogi, Hyderabad (IN); Moe Olia, Algonquin, IL (US); Venkatarao Duggineni, Hyderabad (IN); Jeffry J. Miller, Oro Valley, AZ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 324 days.

(21) Appl. No.: 16/679,672

(22) Filed: Nov. 11, 2019

(65) Prior Publication Data

US 2021/0142242 A1    May 13, 2021

(51) Int. Cl.
*G06F 40/18* (2020.01)
*G06F 11/36* (2006.01)
*G06Q 10/06* (2012.01)

(52) U.S. Cl.
CPC .......... *G06F 40/18* (2020.01); *G06F 11/3604* (2013.01); *G06Q 10/0637* (2013.01)

(58) Field of Classification Search
CPC .. G06Q 10/0637; G06F 11/3604; G06F 40/18
USPC ......................................... 705/7.36; 715/212
See application file for complete search history.

(56) References Cited

U.S. PATENT DOCUMENTS

| | | | |
|---|---|---|---|
| 2008/0178117 A1* | 7/2008 | Gelman | G06F 3/0481 715/808 |
| 2012/0072859 A1* | 3/2012 | Wang | G06K 9/00442 715/764 |
| 2016/0124989 A1* | 5/2016 | Kumar | G06F 16/258 707/690 |
| 2018/0157468 A1* | 6/2018 | Stachura | G06F 40/186 |

OTHER PUBLICATIONS

VEnron: a versioned spreadsheet corpus and related evolution analysis IEEE/ACM 38th International Conference on Software Engineering Companion (ICSE-C) (2016) (Year: 2016).*

* cited by examiner

*Primary Examiner* — Charles Guiliano
(74) *Attorney, Agent, or Firm* — Greenblum & Bernstein, P.L.C.

(57) ABSTRACT

An embodiment of the present invention is directed to a business intelligence testing tool. An embodiment of the present invention is directed to overcoming the tedious manual process of testing BI reports. Generally, BI reports contain Graphs, Data, Reports Formatting and Data Formatting which may need to be validated. An embodiment of the present invention is directed to validating and testing various visualization tools and further analyzing and reporting the data.

18 Claims, 4 Drawing Sheets

SYSTEM AND METHOD FOR IMPLEMENTING SMART BUSINESS INTELLIGENCE TESTING TOOLS

FIELD OF THE INVENTION

The invention relates generally to a system and method for implementing smart business intelligence testing suite of tools.

BACKGROUND OF THE INVENTION

Current systems require extensive testing and validating of business intelligence (BI) reports manually for each and every data point. Business Intelligence generally refers to strategies and technologies for data analysis of business information. BI reports may provide analysis to create strategic business opportunities. Reports may include data, graphs, images, formatting, etc. Data management teams oftentimes require many reports to be validated within a defined window of time requiring functions such as data load, scheduling downloading and manual testing of benchmark and recent reports. BI Platforms are unable to support pre-validation steps such as scheduling reports with new data. Current solutions fail to provide a comprehensive tool to perform the required testing and validation.

These and other drawbacks exist.

SUMMARY OF THE INVENTION

According to one embodiment, the invention relates to a system that implements a business intelligence testing tool. The system comprises: a memory component that stores business intelligence data; an input configured to communicate with one or more business intelligence tools; an interactive interface that communicates with one or more users via a communication network; and a computer processor, coupled to the memory component, the input and the interactive interface, the computer processor configured to perform the steps of: identifying a benchmark file comprising a first set of business intelligence data and images; identifying a target file comprising a second set of business intelligence data and images; verifying a common identifier associated with the benchmark file and the target file; performing data validation between the benchmark file and the target file wherein the data validation comprises identifying data differences, data format differences and graph differences; and providing, via the interactive interface, results of the data validation and identifying one or more differences.

According to another embodiment, the invention relates to a method that implements a business intelligence testing tool. The method comprises the steps of: identifying, via an input, a benchmark file comprising a first set of business intelligence data and images wherein the interface is configured to communicate with one or more business intelligence tools; identifying, via a computer processor, a target file comprising a second set of business intelligence data and images; verifying, via the computer processor, a common identifier associated with the benchmark file and the target file; performing, via the computer processor, data validation between the benchmark file and the target file wherein the data validation comprises identifying data differences, data format differences and graph differences; and providing, via an interactive interface, results of the data validation and identifying one or more differences.

The system may include a specially programmed computer system comprising one or more computer processors, interactive interfaces, electronic storage devices, and networks. The computer implemented system and method described herein provide unique advantages to entities, organizations and other users, according to various embodiments of the invention. An embodiment of the present invention is directed to an automated tool that performs BI validation features and functions. An embodiment of the present invention achieves significant reduction in manual labor, realizes enhanced efficiencies and improves data accuracy. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to overcoming the tedious manual process of testing Business Intelligence (BI) reports. Generally, BI reports contain Graphs, Data, Reports Formatting and Data Formatting which may need to be validated. An embodiment of the present invention is directed to validating and testing various visualization tools and further analyzing and reporting the data.

In addition to data validation, an embodiment of the present invention may perform various tasks including scheduling and downloading reports from various BI/Reporting Tools. For example, integration with BI Reporting Tools may involve Business Objects (BOBJ), Tableau and Qlick-View, among others. An exemplary embodiment of the present invention may be developed in Python programming language and Image processing. BI Reporting Tools may include other reporting and analytics business intelligence (BI) platforms.

An embodiment of the present invention is directed to providing graph and/or image compression, data format comparison, scheduling and refreshing and downloading Business Intelligence reports in a predetermined format automatically.

An embodiment of the present invention may include at least two parts: (1) Integration with BI tools and (2) Validating Reports.

Integration with BI-tools may involve: (1) identifying desired report location in a server; (2) scheduling a report with prompts/parameters if required; (3) verifying a schedule task status, if an error occurred identifying the error message; (4) refreshing reports and (5) downloading reports and/or documents in a preferred format to a desired location.

An embodiment of the present invention may communicate with the BI tools in JSON language, for example, to perform tasks in an efficient and streamlined manner that includes downloading reports to a specified location without manual intervention.

Figure 1:
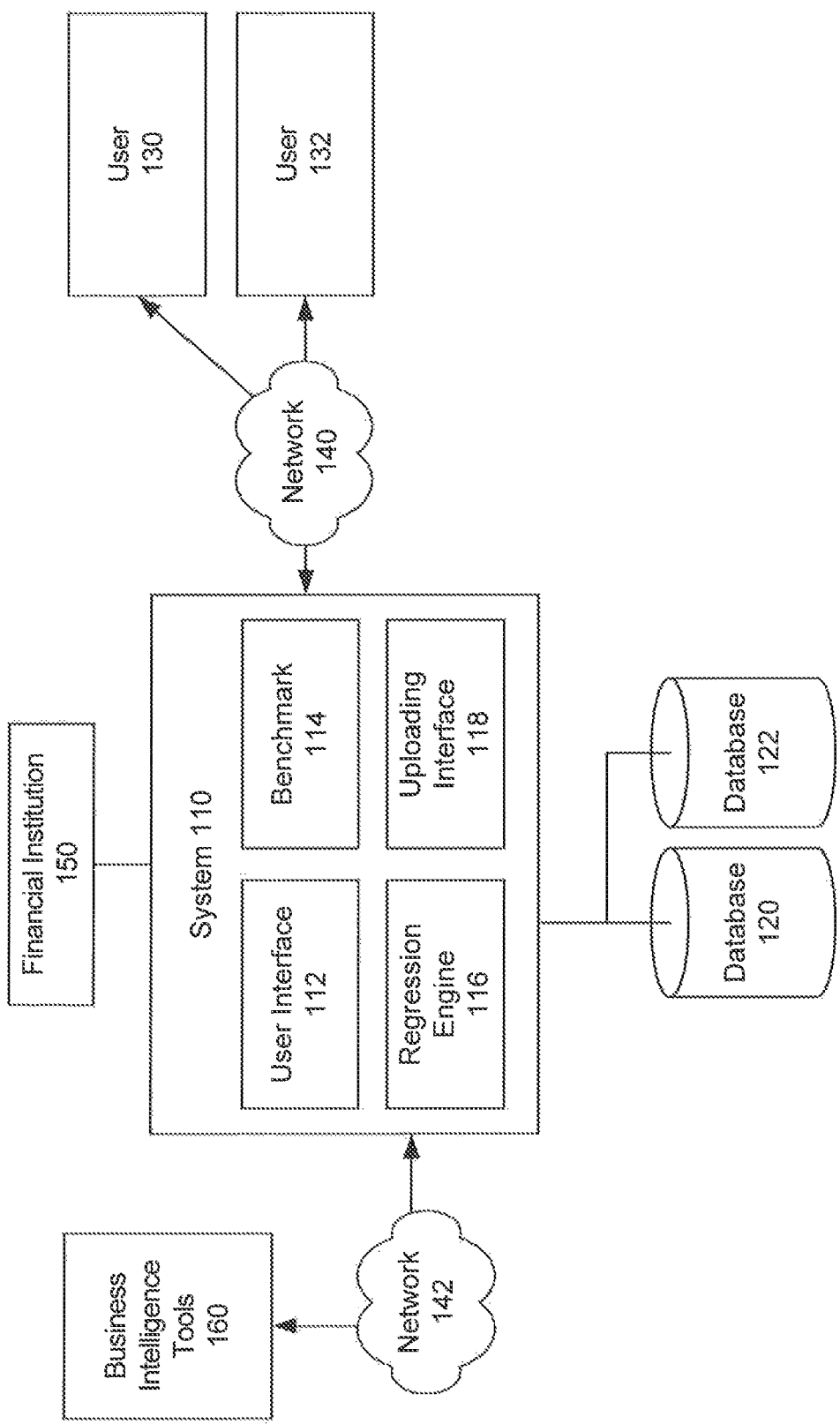
FIG. 1 illustrates a system that implements a smart business intelligence testing suite, according to an embodiment of the present invention.

FIG. 1 illustrates a system that implements a smart business intelligence testing suite, according to an embodiment of the present invention. As shown in FIG. 1, a user may access System 110 through a client device or system. System 110 may represent a smart business intelligence testing suite with various processing components represented by User Interface 112, Benchmark 114, Regression Engine 116 and Uploading Interface 118. The components illustrated in FIG. 1 are merely exemplary, other devices may be represented in various applications. While a single component is illustrated, each component may represent multiple components.

Users, represented by 130, 132, of an embodiment of the present invention may communicate with System 110 via Network 140 through a User Interface, represented by 112. Communication may be performed using any mobile or computing device, such as a laptop computer, a personal digital assistant, a smartphone, a smartwatch, smart glasses, other wearables or other computing devices capable of sending or receiving network signals.

Benchmark 114 may enable a user to create a Benchmark file. A Benchmark file may represent a set of data from which to make a comparison. For example, a user may select an option to browse files to create benchmark files in a specific folder location. For example, a user may download reports and/or documents to specified path.

Regression Engine 116 may run a Regression process. For example, a user may specify paths which may include a path where reports have been downloaded and a path to download new reports and compare them. The Regression process refers to returning to a previous state or condition. The Regression process involves checking that the latest report is in same state as a previous report (e.g., benchmark, etc.).

Uploading Interface 188 may schedule and refresh reports where prompts, parameters and/or filters may be specified. To fetch data into BI reports, an embodiment of the present invention may filter data by various factors or conditions instead of getting the full data into report to schedule or populate reports, graphs, etc. For example, filters may include identifying the last 30 days of transactions, least sold product, etc. For example, the required prompts for reports with a report identifier may be specified in a file, e.g., Excel file. If no prompts exists, only report identifiers may be specified to run or execute. The file may then be uploaded to a user interface. According to an exemplary illustration, creating prompts may be considered a one-time task for reports if no changes in prompts option.

Once the options entered with correct credentials, an embodiment of the present invention may communicate, via Network 142, with a Business Intelligence Tool, represented by 160 and download the reports as files, e.g., Excel files, spreadsheet files, in a specified folder, after scheduling and refreshing reports with a schedule status in a separate file.

An entity, such as a financial institution 150, may host System 110 according to an embodiment of the present invention. The entity may support business intelligence testing features as an integrated feature or system. According to another example, business intelligence testing services may be offered by a third party service provider. Other scenarios and architectures may be implemented. An embodiment of the present invention may send and/or receive data from various other sources represented by databases 120, 122. Databases may be internal or external to a host entity. Data may be stored and managed in storage components via one or more networks. Databases may include any suitable data structure to maintain the information and allow access and retrieval of the information. The storage may be local, remote, or a combination thereof with respect to Databases. Communications with Databases may be over a network, or communications may involve a direct connection between Databases and other participants, as depicted in FIG. 1. Databases may also represent cloud or other network based storage or an application presenting a data source via an API.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

Figure 2:
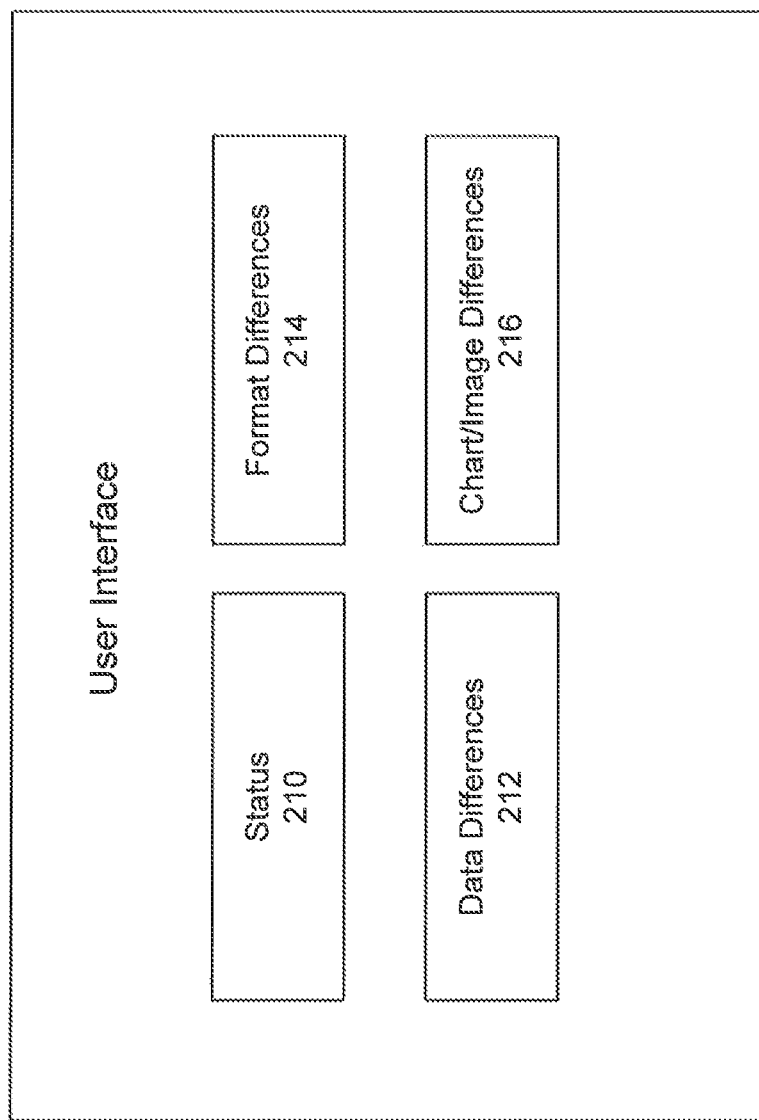
FIG. 2 is an exemplary illustration of a user interface, according to an embodiment of the present invention.

FIG. 2 is an exemplary illustration of a user interface, according to an embodiment of the present invention. User Interface may provide data in various output formats, including interactive reports, etc. The Output may include components including Status 210, Data Differences 212, Format Differences 214 and Chart/Image Differences 216. Other comparisons and differences may be identified and provided to a requesting entity.

Status 210 may represent details relating to an overall status file. Status 210 may contain schedule status with report ID name and number of data differences, chart differences, format and data format differences and abort validation status.

Data Differences 212 may contain report name, sheet name, cell location, value in benchmark file and value in target file for every data difference in file.

Format Differences 214 may contain report name, sheet name, cell location, value in benchmark file, value in target file with their own formats and name of format differences. In the process of format check, formatting report formats, e.g., background color, border color etc., may be addressed which may be considered as report format differences.

Figure 4:
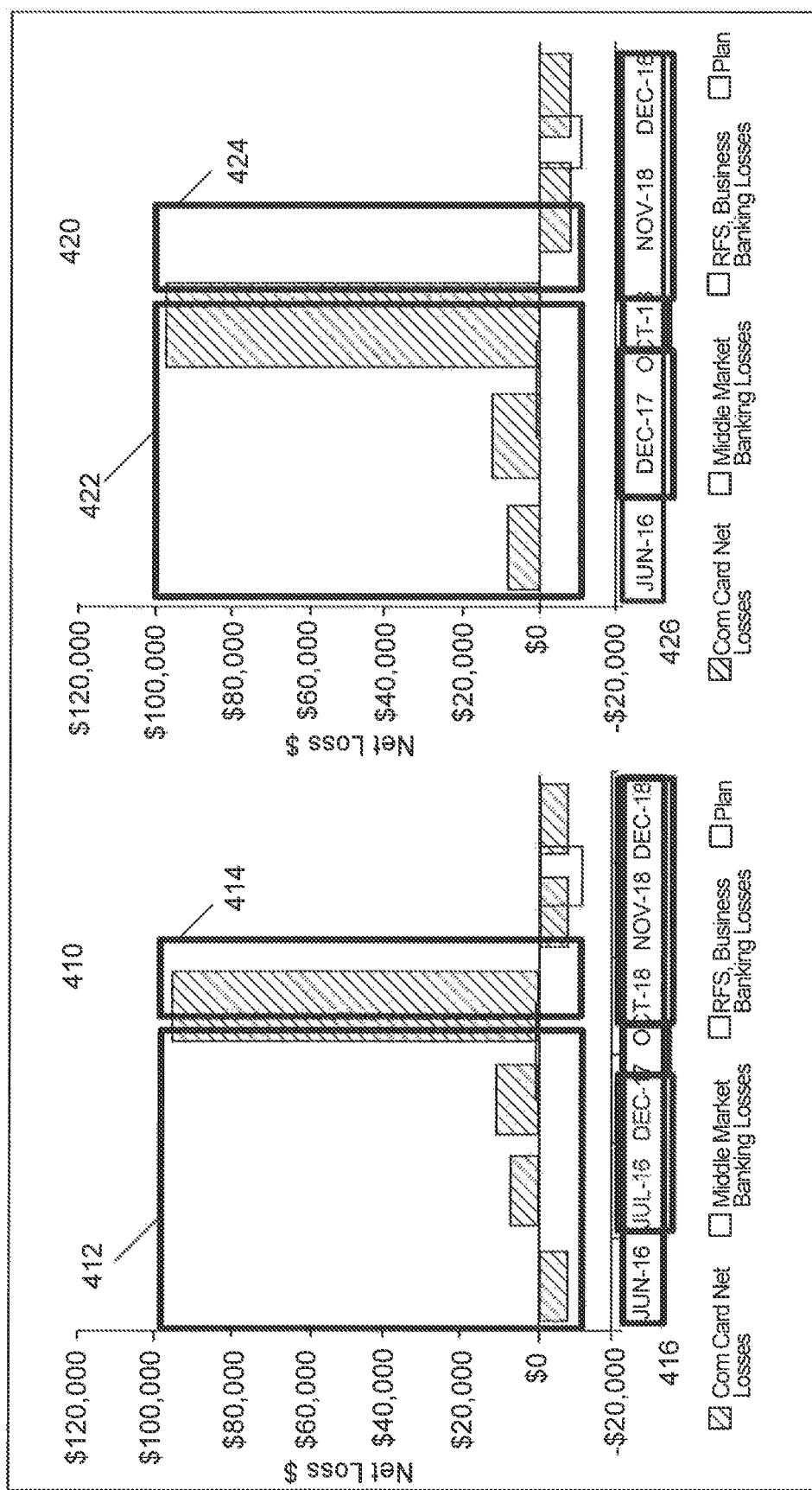
FIG. 4 is an exemplary illustration of a Business Intelligence data comparison, according to an embodiment of the present invention.

Chart/Image Differences 216 may contain a number of chart differences with report name and file name where graph differences may be mentioned as shown in FIG. 4 detailed below.

An embodiment of the present invention may be directed to validating reports when a Run Regression is executed. For example, validation of a specific report may be performed if a report file is present in both folders (e.g., Benchmark folder and Target folder) with same (or similar, related) name or identifier. In addition, an absence of report may be notified in a status file.

Figure 3:
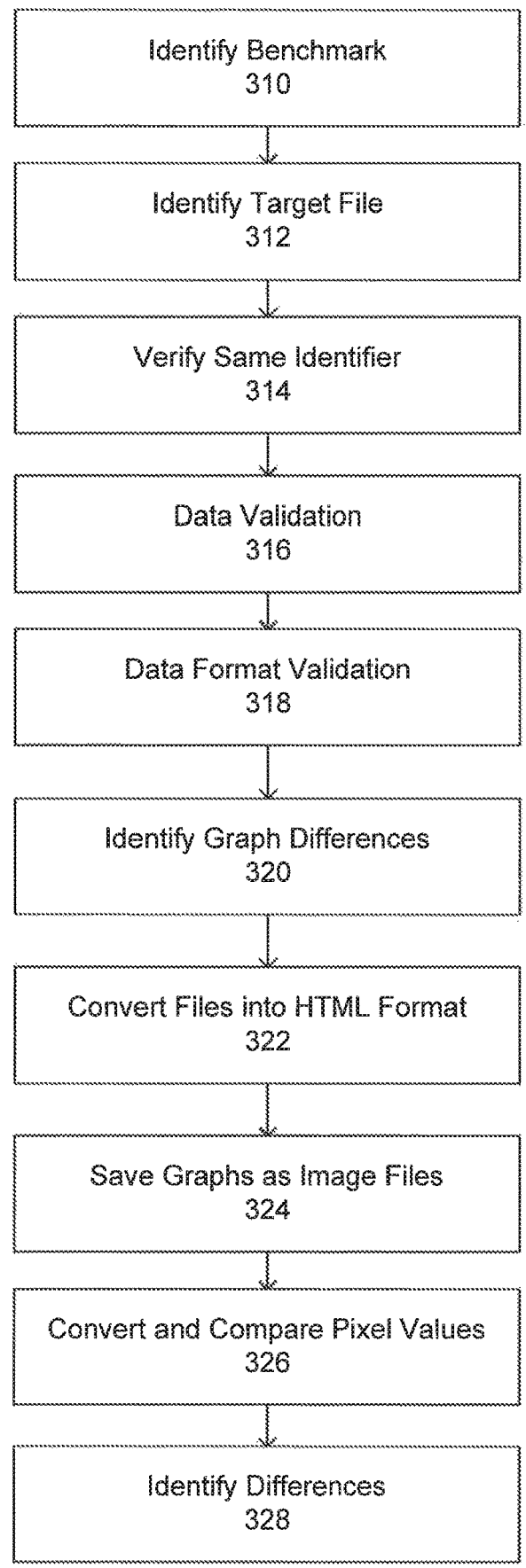
FIG. 3 illustrates an exemplary flow chart of a validation process, according to an embodiment of the present invention.

FIG. 3 illustrates an exemplary flow chart of a validation process, according to an embodiment of the present invention. At 310, a benchmark file may be identified. At step 312, a target file may be identified. At step 314, the same (similar or related) identifier may be verified. At step 316, data validation may be performed. At step 318, data format validation may be performed. At step 320, graph differences may be identified. At step 322, files may be converted into HTML format. At step 324, graphs may be saved as image files. At step 326, pixel values may be converted and then compared. At step 328, differences may be identified. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

According to an exemplary illustration, once both folders contains a file with the same name (similar or related identifier), various items may be validated at steps 310 and 312. For example, an embodiment of the present invention may check that both files contain a same number of sheets with the same names and in the same sequence at step 314. If not, an embodiment of the present invention may abort the validating file and move to a new file with a status update.

In each sheet, an embodiment of the present invention may check each and every cell value in both files to determine whether values are the same in the exact same cell location, at step 316. If differences are detected, an embodiment of the present invention may then write differences in a data difference status file.

At each and every cell location in both files, an embodiment of the present invention may check for data format differences like (e.g., bold, italic, color, font type, background color, border color, border style, etc.) at step 318. Various formatting checks may be performed. Formatting checks may include Font, Background Color, Border, Format, Protection, Alignment Horizontal, Alignment Indent, Alignment Rotation, Alignment Shrinked to Fit, Alignment Text Direction, Alignment Text, Wrapped, Alignment Vertical, Background Color Index, Background Fill Pattern, Background Color Pattern Index, Border Bottom Color, Border Bottom Line Style, Border Diagonal Color Index, Border Diagonal Down, Border Diagonal Line Style, Border Diagonal Up, Border Left Color Index, Border Left Line Style, Border Right Color Index, Border Right Line Style, Border Top, Color Index, Border Top Line Style, Font Index, Format Key, Style, Lotus 123 Prefix, Parent Style Index, Protection Cell Locked, Protection Formula Hidden, Font Format Color Index, etc. If differences are identified, status may be updated in format difference status file in detail.

An embodiment of the present invention may identify graph differences, at step 320. For example, files in both folders may be converted to HTML format individually at step 322. This may occur once the validation steps are completed. When converting files to HTML, an embodiment of the present invention may save graphs as image files, e.g., JPEG image files, at step 324. An embodiment of the present invention may determine whether the count of images matches in both files.

Utilizing the mathematical concepts and python computational power, images may be mad into python as m*n*n matrices (numbers). In this example, any image may be represented by different color intensity levels in various parts of the image as pixel values (e.g., 0 to 255). Other values and representations may be implemented.

An embodiment of the present invention may convert images into simple numbers where pixel values for two different images may be compared. An embodiment of the present invention may highlight the differences using an image processing concept.

FIG. 4 is an exemplary illustration of a comparison, according to an embodiment of the present invention. Image 410 may represent a graph from a file in a benchmark folder. Image 420 may represent a graph from a file in target folder/newly download. An embodiment of the present invention may identify differences in images as well as text. As shown in FIG. 4, graphical differences may be identified at 412 compared to 422; and 414 compared to 424. Text differences may be identified at 417 and 426. Other indicators and data may be compared and identified to a user.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a business intelligence testing tool, the system comprising:
   a memory component that stores business intelligence data;
   an input configured to communicate with one or more business intelligence tools;
   an interactive interface that communicates with one or more users via a communication network; and
   a computer processor, coupled to the memory component, the input and the interactive interface, the computer processor configured to perform the steps of:
   identifying a benchmark file comprising a first set of business intelligence data and images;
   identifying a target file comprising a second set of business intelligence data and images;
   verifying a common identifier associated with the benchmark file and the target file;
   confirming, upon verifying the common identifier, the benchmark file and the target file contain an equal number of sheets with same names and in a same sequence;
   performing, upon confirmation, data validation between the benchmark file and the target file by identifying data differences, identifying data format differences, and identifying graph differences, the graph differences comprising converting the benchmark file and the target file into a HTML format,
   wherein the converting the benchmark file and the target file into the HTML format includes saving graphs as images;
   determine whether a count of the images matches in the benchmark file and the target file; and
   providing, via the interactive interface, results of the data validation and identifying one or more differences.

2. The system of claim 1, wherein the data format validation comprises identifying differences in font style, background and border style.

3. The system of claim 1, wherein the images are converted into a set of pixel values.

4. The system of claim 1, wherein the interface identifies one or more differences by comparing a first image in the benchmark file and a second image in the target file.

5. The system of claim 1, wherein the benchmark file is accessed via the business intelligence tool.

6. The system of claim 1, wherein the data differences comprise differences in report name, sheet name, cell location and values.

7. The system of claim 1, wherein the data format differences comprise differences in background color and border color.

8. The system of claim 1, wherein the graph differences comprise differences in images, charts, icons and color.

9. The system of claim 1, wherein the input configured to communicate with one or more business intelligence tools is further configured to perform scheduling and reporting downloading from each of the one or more business intelligence tools.

10. A method that implements a business intelligence testing tool, the method comprising:
   identifying, via an input, a benchmark file comprising a first set of business intelligence data and images wherein the input is configured to communicate with one or more business intelligence tools;
   identifying, via a computer processor, a target file comprising a second set of business intelligence data and images;
   verifying, via the computer processor, a common identifier associated with the benchmark file and the target file;
   confirming, upon verifying the common identifier, the benchmark file and the target file contain an equal number of sheets with same names and in a same sequence;
   performing, via the computer processor and upon confirmation, data validation between the benchmark file and the target file by identifying data differences, identifying data format differences, and identifying graph differences, the graph differences comprising converting the benchmark file and the target file into a HTML format,
   wherein the converting of the benchmark file and the target file into the HTML format includes saving graphs as images;
   determine whether a count of the images matches in the benchmark file and the target file; and
   providing, via an interactive interface, results of the data validation and identifying one or more differences.

11. The method of claim 10, wherein the data format validation comprises identifying differences in font style, background and border style.

12. The method of claim 10, wherein the images are converted into a set of pixel values.

13. The method of claim 10, wherein the interface identifies one or more differences by comparing a first image in the benchmark file and a second image in the target file.

14. The method of claim 10, wherein the benchmark file is accessed via the business intelligence tool.

15. The method of claim 10, wherein the data differences comprise differences in report name, sheet name, cell location and values.

16. The method of claim 10, wherein the data format differences comprise differences in background color and border color.

17. The method of claim 10, wherein the graph differences comprise differences in images, charts, icons and color.

18. The method of claim 10, wherein the interactive interface configured to communicate with one or more business intelligence tools is further configured to perform scheduling and reporting downloading from each of the one or more business intelligence tools.

* * * * *